June 3, 1930.  G. BROWNING  1,761,191
LAWN SPRINKLER
Filed April 11, 1927   3 Sheets-Sheet 1
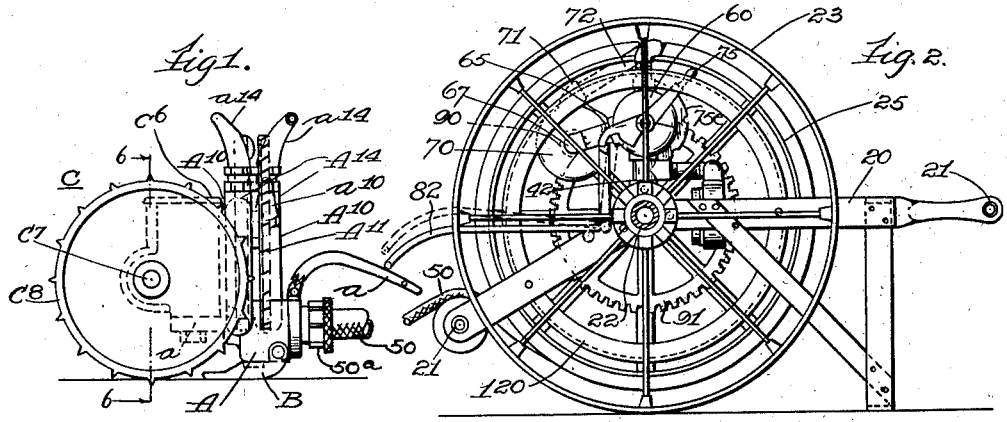
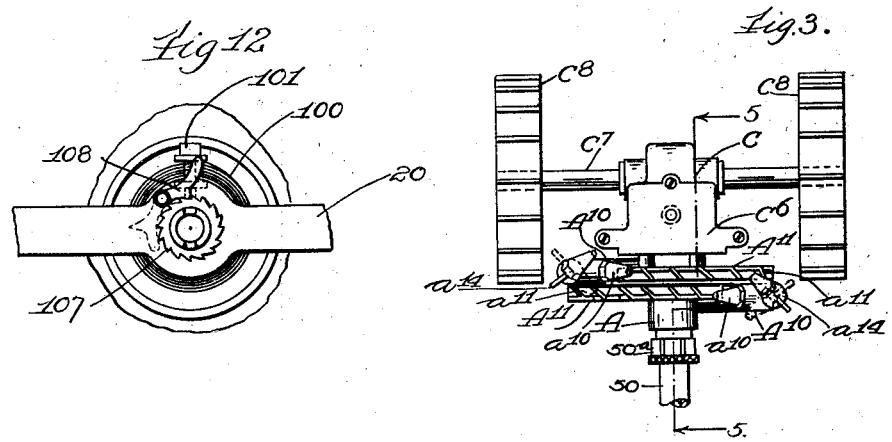
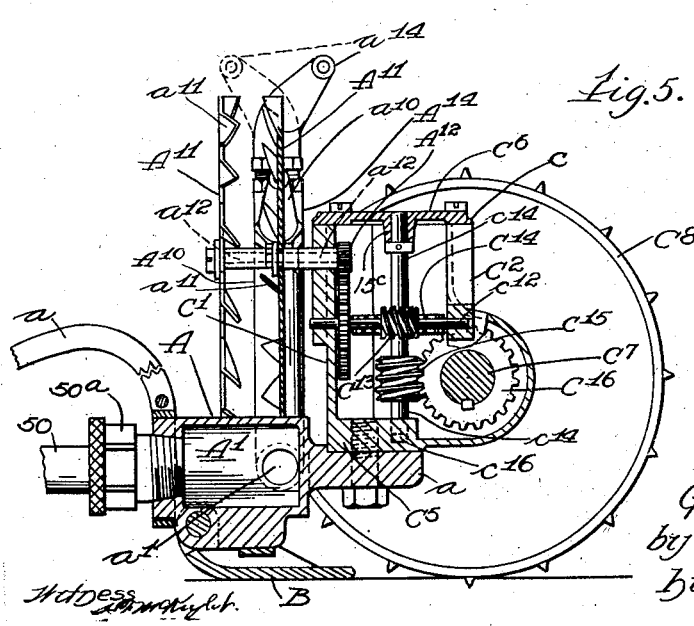
Inventor.
George Browning
by his Attorneys.

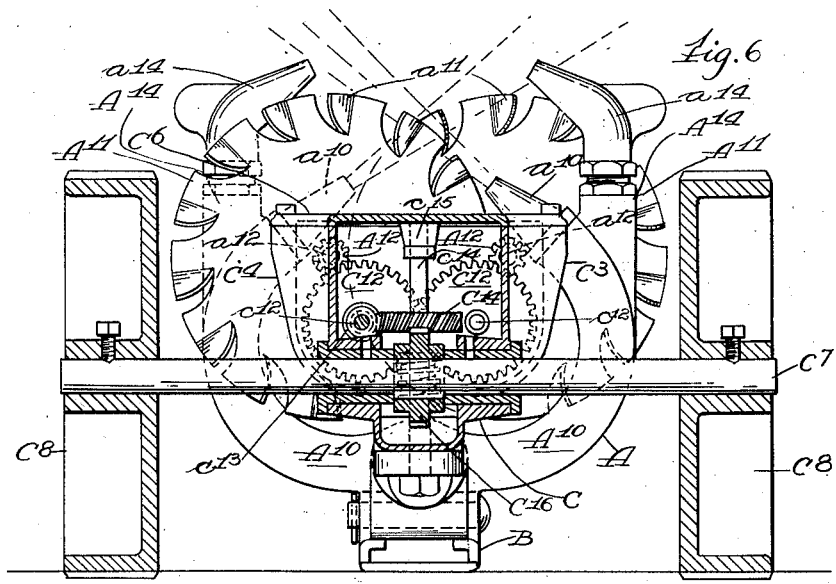
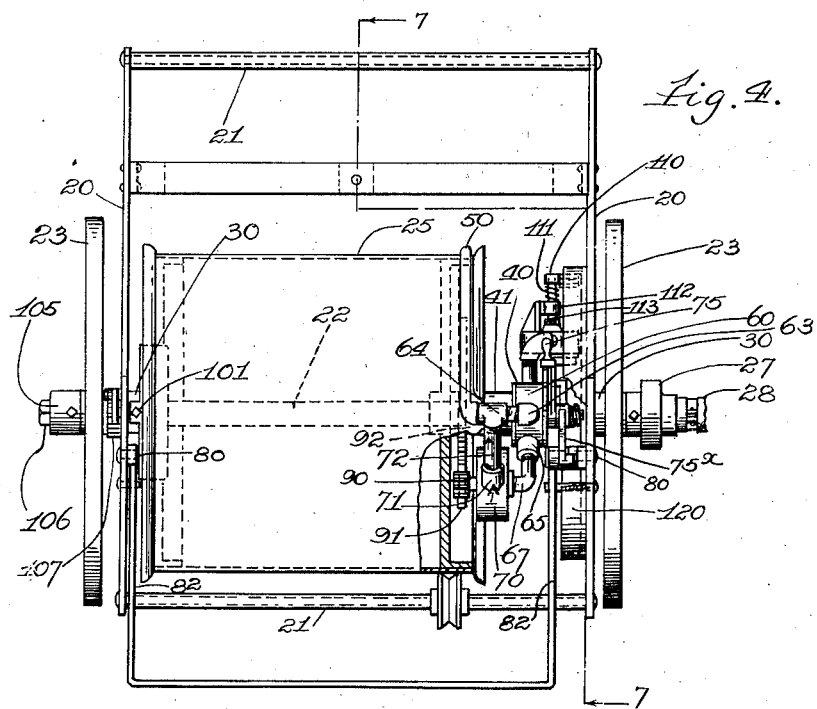

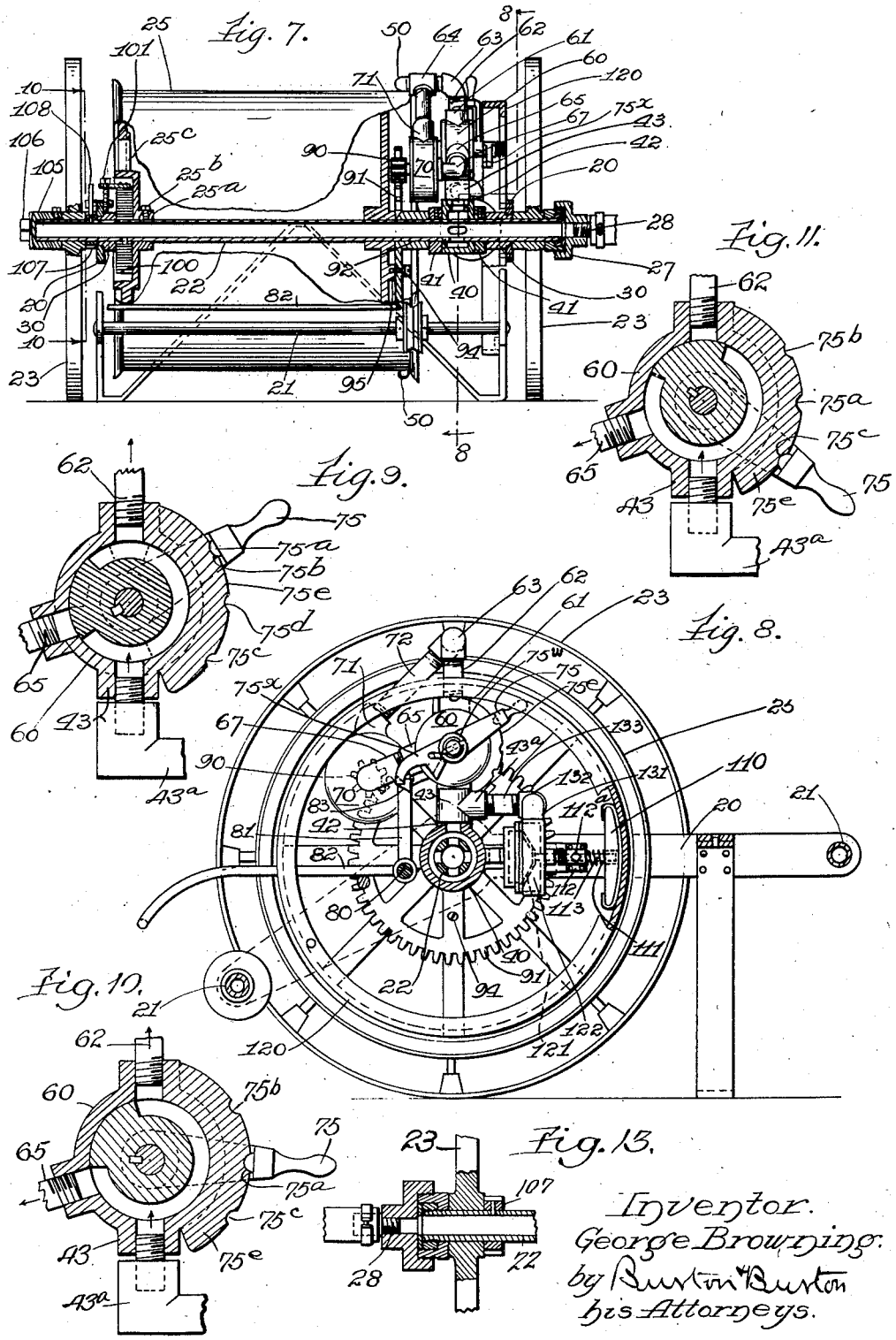

Patented June 3, 1930

1,761,191

UNITED STATES PATENT OFFICE

GEORGE BROWNING, OF WILMETTE, ILLINOIS, ASSIGNOR TO CHICAGO FLEXIBLE SHAFT COMPANY, OF CHICAGO, ILLINOIS, A CORPORATION OF ILLINOIS

LAWN SPRINKLER

Application filed April 11, 1927. Serial No. 182,675.

The purpose of this invention is to provide an improved construction of the general character commonly known as lawn sprinkler, adapted for being automatically propelled over the area to be watered, the invention also including a hose reel for wind-up the hose connection provided for supplying water to the sprinkler device, and for retracting the sprinkler to the reel in thus winding up the hose on the latter, the reel being adapted for maintaining connection of the hose with the water supply and with the sprinkler throughout winding and unwinding of the hose on the reel. The invention consists in the elements and features of construction for the purposes indicated and other incidental thereto which are shown and described, as indicated in the claims.

In the drawings:—

Figure 1 is a side elevation of the sprinkler carriage and sprinkler mechanism thereon.

Figure 2 is a side elevation of the hose reel and operating connections.

Figure 3 is a plan view of the sprinkler carriage and sprinkler mechanism thereon.

Figure 4 is a plan view of the hose reel and connections.

Figure 5 is a section at the line, 5—5, on Figure 3.

Figure 6 is a section at the line, 6—6, on Figure 1, on an enlarged scale.

Figure 7 is a partly sectional elevation of the hose reel, section being made in vertical plane axial with respect to the reel and carrying wheels.

Figure 8 is a section at the line, 8—8, on Figure 7.

Figure 9 is a detail section of the water controlling valve.

Figures 10 and 11 are similar views showing the valve in different positions.

Figure 12 is a view showing the ratchet locking device for winding the spring.

Figure 13 is a detail section of the left hand end portion of the wheel carriage structure showing a swivel connection of the water supply pipe at that end similar to that shown at the other end in Figure 7.

The apparatus shown in the drawings comprises two parts which are capable of functioning separately from each other for certain purposes and for co-operating for the total purpose of the present invention as above stated. These two parts are respectively a hose reel and a carriage and a sprinkler mechanism and a carriage. The hose reel and carriage will be first described.

It is shown in side elevation in Figure 2, in plan view in Figure 4, in partly sectional front elevation in Figure 7 and in end elevation inside the carrying wheel in Figure 8. It comprises a frame or reel support consisting of longitudinal frame bars, 20, 20, and cross frame bars, 21, 21, this frame structure being carried on the axle, 22, of the carrying wheels, 23, 23. As shown in the drawings the axle, 22, is journaled on the longitudinal bars of the frame, as seen at 30, 30, and constitutes also the shaft of the reel, 25, and by reason of this double function is hereafter referred to as the shaft in common of the hose reel and carrying wheels. The reel is preferably in the form of a sheet metal drum which is mounted loose for rotation on the axle, but adapted to be made fast with the axle for rotation therewith or thereby for any purpose for which such rotation of the two parts together may be desirable. The axle, 22, is tubular, at least as to a portion of its length, and is shown tubular throughout its length, this being the more convenient construction, permitting the use of ordinary pipe for this purpose, and also making it possible to connect the water supply pipe at either end as hereinafter indicated. The carrying wheels, 23, 23, are mounted loose on the axle for rotation thereabout, but adapted to be made fast for rotation therewith for any purpose for which this may be desirable. Said carrying wheels are mounted on the axle outside the frame bars, 20, 20, and outside one of said carrying wheels the pipe axle is connected by a pipe, 28, with a source of water supply not shown, the connection being made by a swivel coupling, 27, to permit the rotation of the axle relatively to the water supply pipe connection under any circumstances under which such relative rotation may be desirable. At the opposite side of said carrying wheel and inside the adjacent frame bar connection is made with the pipe axle 22 for leading water to the hose wound upon the reel, said connection being made by a swivel-T-fitting, 40, in which the pipe axle, 22, may rotate, the swivel-T-fitting being held against longitudinal movement on the pipe by stop collars 41, 41, and having its stem connected by a conduit hereinafter described in detail which leads radially with respect to the drum to the outer circumference thereof for connection with the inner end of the hose, 50. As shown this conduit comprises the stem, 42, of the swivel-T-fitting, 40, a T-fitting, 43, having one end of its cross member connected to said stem, 42, and its own stem opening rearward for a connection serving a purpose hereinafter described, the other end of its cross member being connected to the intake of a three-way valve, 60, which has an outlet, 61, connected by a nipple, 62, and elbow, 63. and T-fitting, 64, with the inner end of the hose, 50. The other outlet, 65, of the three-way valve is connected by an elbow, 67, with the central inlet of a water motor, 70, of the turbine type, having its peripheral discharge at 71, connected by a pipe nipple, 72, with the stem of the T-fitting, 64.

Disregarding for the present the rearwardly-leading stem of the T, 43, and assuming that it is closed, it may be understood that the water connections above described comprise a conduit from the pipe axle 22 to the hose by way of the three-way valve, 60, with a by-pass from said valve to the hose, 50 in which is located and connected the motor, 70. And upon considering the construction of the three-way valve as seen in Figure 9, it may be understood that this valve when set at the position shown in full lines in Figure 9, with the detent, 75$^a$, engaged at the notch, 75$^b$, in the segment, 75$^e$. affords direct connection for the entire water supply to pass from the pipe axle, 22, to the hose, 50, the motor being cut out and thereby out of service for any purpose for which it may be intended; and it will be understood that at a second position of the three-way valve, namely, the position at which its operating lever 75, has its detent, 75$^a$, engaged at the notch, 75$^c$, in the exteriorly projecting segment, 75$^e$, the valve closes direct communication between the pipe axle and the hose and opens communication from the pipe axle 22 thru the nipple, 65, and elbow, 67 to the motor from which the water having operated the motor passes by way of the nipple, 72, and T-fitting, 64, to the hose, 50, so that on its path from the pipe axle to the hose the water will have operated the motor for any purpose for which it may be connected as hereinafter described. And it will be understood that at an intermediate position between the two positions already described, namely, the position at which the detent, 75$^a$, is engaged with the notch, 75$^d$, in the segment 75$^e$ as shown in Figure 10, the valve will stand at a position intermediate the two outlets, to the motor and to the hose respectively, so that the water supply will pass in part directly to the hose and in part through the motor to the hose; and that the proportion of water passing directly to the hose and directly to the motor may be varied by adjusting the valve to positions intermediate that of Figure 10, and those of Figures 9 and 11 respectively,—that is, so as to partly close either of the connections, 62, or, 65, leaving the other wide open.

The intent of the provision of the motor and its connection as above described is that the force of the water on its way to the hose may be utilized for operating the reel, which is effected by means of a pinion, 90, on the motor shaft engaging the gear, 91, mounted rotatably on the pipe axle as seen at 92, and provided with means for making it fast to the reel indicated by the bolt, 94, which is set through a spoke of the gear into a boss, 95, provided on the head of the reel drum. In addition to, and adapted to be substituted for, or employed conjunctively with the water motor means for operating the reel, there is provided at the opposite end of the reel, a spring motor means, consisting of a coil spring, 100, housed in the head of the reel drum having its inner end secured to the pipe axle and its outer end adapted to be secured to the frame bar, 20, as by means of a bolt, 101. For winding up the spring, the end of the axle outside the wheel at the side at which the spring is housed in the drum as described is provided with a cap, 105, having a suitably squared terminal, 106, for receiving a crank-key device for rotating the axle, thereby winding up the spring, a ratchet disk, 107, being made fast upon the axle immediately outside the frame bar and between the same and the carrying wheel and a pawl, 108, being mounted upon the frame bar for engaging the ratchet for holding the spring coiled in its housing ready to react for rotating the reel. And if convenient or preferred the spring may be wound by the rotation of the reel in unwinding the hose.

When the spring motor is to be utilized for winding up the hose on the reel, the latter is made fast to the shaft, 22, by the set screw, 25$^b$, in the hub, 25$^a$, provided on the inner side of the head of the reel at the end in which the spring is housed, a hand hole, 25$^c$, being provided in the reel drum near that end for access to set or release the screw; and the pawl, 108, is disengaged from the ratchet, as seen in dotted line in Figure 12, leaving the shaft, 22, free to rotate in its journal bearings on the frame for rotating the reel.

It will be observed that the water motor being geared to the reel drum, and the spring being fastened to the shaft to which the reel drum is made fast as described, both motors may be used at the same time for winding up the hose on the reel. And it will be further observed that when the reel hub is not fastened by the set screw to the shaft, 22, the operation of the reel by the water motor alone is not impeded by the presence of the spring motor, because even if the pawl is left engaged with the ratchet and the shaft is thereby held against rotation in the direction for winding up the hose, all the parts rotating with the reel are free to thus rotate on the shaft.

It will also be observed that when the spring motor is used alone for winding up the hose on the reel, the water motor may be prevented from impeding with the rotation of the reel by withdrawing the bolt, 94, which secures the gear, 91, to the reel.

In view of the axle, 22, being a pipe hollow from end to end, it will be obvious that the swivel connection of the water supply pipe can be made at the left hand end (referring to Figure 7) in the same manner as it is shown at the right hand end, and this modification is shown in Figure 13 wherein the parts constituting the swivel connection are indicated by the same reference numerals as the similar parts shown at the right hand end. It will be understood that in case the swivel connection is made at the left hand end, the right hand end will be closed by a cap, 105, as shown at the left hand end in Figure 7.

For governing the rate at which either the water motor or the spring or both together when it is desired to utilize both for the purpose, actuate the reel for winding the hose, there is provided a brake device consisting of a brake shoe, 110, mounted on the right hand frame bar as seen in Figure 8, and cooperating with a brake ring, 120, which is mounted rigidly on the frame bar, 20, a spring, 111, being provided reacting between the brake shoe and a bracket, 112, by which the stem, 113, of the brake shoe is guided. Said stem extends to and is connected with a flexible diaphragm, 121, which constitutes one wall of a chamber, 122, which is connected by suitable pipe fittings, 131, 132, 133, with the rearwardly projecting stem, 43ª, of the T, 43, above mentioned, whereby the pressure of the water supply through the pipe axle operates upon the flexible diaphragm for retracting the brake shoe against the reaction of the spring, 110, to relieve the pressure of the shoe upon the brake ring, 120, more or less, as the water pressure is greater or less, with the effect,—which will be understood is the purpose of the construction,—to cause the reel to be wound more rapidly as the water pressure is greater; so that the sprinkler will be caused to traverse the area to be watered more rapidly proportionately to the rate at which the water is delivered from the sprinkler, so that the watering may be substantially uniform, notwithstanding varying pressure of the water supply.

When there is occasion for rotating the reel in either direction freely by hand the brake shoe may be retracted from the brake ring and secured out of contact therewith by means of a set screw, 112ª, set in the bracket, 112, rendering the brake stem fast in the bracket.

As will be hereafter particularly described, the intent of the entire apparatus is that the hose will be unwound from the reel for locating the sprinkler carriage at the limit of distance from the reel determined by the length of the hose, and that the sprinkler will be retracted or propelled back toward the hose carriage for watering the area in front of the hose reel and between the same and the position to which the sprinkler carriage has been withdrawn in unwinding the hose. And it will be understood that the intent of the construction as thus far described is to render the operation of the total structure substantially automatic in respect both to the control of the water supply and the retraction of the sprinkler carriage throughout the entire range of its travel back to the hose carriage. And in order that the operation may not require critical attention of the person in charge, but that, on the contrary, the water shall be shut off and the operation stopped automatically upon the arrival of the sprinkler carriage back at the hose carriage, there is provided means by which the hose carriage operates the valve, 60, for shutting off the water both from the hose and from the motor. The construction for this purpose will be now described.

The valve lever, 75, is formed for securement to the valve stem with a hub, 75ʷ, keyed to the stem; and from the hub a second lever, 75ˣ, which may be referred to as the trip lever, projects in the opposite direction from the lever, 75, as seen in Figures 7 and 8; and on the frame bar, 20, there is fulcrumed at 80 a bell crank lever, 81, 82, whose upstanding arm, 81, has at its upper end a lateral extension, 83, which widens the end for receving the encounter of the end of the lever arm, 75ˣ, in the rotation of the entire valve body with the reel, when the bell crank lever, 81, 82, is rocked over its fulcrum by lifting the forward end of the forwardly extending arm, 82, from the position shown in full line to the position shown in dotted line in Figure 2. The sprinkler carriage, A, hereinafter described, has an arm, a, extending in the direction of travel of said carriage back toward the reel carriage, said arm being positioned for encounter with the arm, 82, when the winding up of the hose on the reel has brought the sprinkler carriage back nearly to the hose reel carriage as seen in Figure 1, and by such encounter the bell crank lever is rocked to position for stopping the valve lever and closing the valve, shutting off the water both from the hose and from the motor.

The lawn sprinkler device shown in Figures 1, 3 and 5 to which the hose, 50, is connected, comprises a water-dispersing apparatus, A, a supporting shoe, B, and a wheeled carriage, C, upon which it is mounted and carried. The water-dispersing apparatus comprises a water inlet chamber, $A^1$, adapted for connection with the hose, 50, by means of a coupling, $50^a$, and having outlets at $a^1$ into two similar branches, $A^{10}$, $A^{10}$, projecting from the opposite sides of the chamber, $A^1$, and both extending in curved form about 180 degrees outward, upward and inward, terminated by discharge nozzles, $a^{10}$, $a^{10}$, trending for discharge obliquely upward and toward each other as seen in Figure 6. The carriage indicated in totality by C, comprises integrally a gear casing and frame structure consisting of a cast housing having upright walls, $C^1$ and $C^2$, and a separable top or cap member, $C^6$, the whole being mounted by means of the bottom wall, $C^5$, on a horizontally projecting lug, $a$, of the chamber, $A^1$, of the water-dispersing apparatus. The carriage comprises further an axle, $C^7$, journaled in the end walls, $C^3$ and $C^4$, of the housing and extending therethrough, and carrying wheels, $C^8$, $C^8$, mounted fast upon the opposite ends of said axle. In the upright wall, $C^1$, of the housing there are journaled shafts, $a^{12}$, of disks, $A^{11}$, which are positioned substantially parallel and proximate to the lines of discharge of the nozzle, $a^{10}$, $a^{10}$, as may be most clearly understood from Figure 5. Said disks are relatively displaced along the line of travel of the carriage, the nozzles, $a^{10}$, $a^{10}$, being correspondingly displaced for discharge relatively to the planes of the disks as stated, and said disks are provided with circumferentially distributed and spaced vanes, $a^{11}$, which are struck out from said disks at their sides respectively toward each other, said disks being positioned by the journaling of their shafts in the housing wall, $C^1$, as stated, so that they overlap each other, as seen in Figure 6, nearly to the extent of their radial dimensions.

From the construction as thus far described it may be understood that the water delivered through the hose to the chamber, $A^1$, and from said chamber to the branches, $A^{10}$, $A^{10}$, and discharged from the nozzles, $a^{10}$, $a^{10}$, impinges upon the vanes, $a^{11}$, of the disks, $A^{11}$, with the effect of rotating said disks and simultaneously dispersing the water by reason of its impact against the vanes, which are struck out obliquely with respect to the planes of the disks with the side toward the obtuse angle exposed to the impact of the jet. The effect of such impact, it will be recognized, will be to disperse the water laterally with respect to the disk, while at the same time it is discharged in part tangentially over the disk, so that large areas on both sides of the apparatus are reached by the spray which is spread more widely in the direction of travel of the carriage but less distantly from the line of travel than it would be by the mere normal discharge from the nozzle, on account of its impact upon the oblique planes of the disks. And it will be further understood that the disks are rotated by the impact of the water jet upon their vanes so that they may be considered as constituting a water motor of the character of an overshot wheel.

The shafts, $a^{12}$, carry at their ends within the housing pinions, $A^{12}$, meshing respectively with gears, $C^{12}$, whose shafts, $c^{12}$, are journaled in the opposite upright walls, $C^1$, and $C^2$, of the housing and have rigid with them within the housing, worms, $C^{13}$, which mesh with a horizontal worm gear, $C^{14}$, at opposite sides of said gear, which has a vertical shaft, $c^{14}$, suitably journaled as to its bearings, $c^{15}$ and $c^{16}$, respectively in the bottom wall, $C^5$, and cap plate, $C^6$, of the housing. Said shaft, $c^{14}$, carries below the gear, $C^{14}$, a worm, $C^{15}$, rigid with said shaft and meshing with a gear, $C^{16}$, fast on the axle, $C^7$. From this description it will be understood that the rotation of the disks, $A^{11}$, caused by the impact of the water jets from the nozzle, $a^{10}$, $a^{10}$, operates for rotating at very greatly reduced speed the axle, $C^7$, in the direction for travel of the carriage forwardly i. e. toward the hose reel, considering the side at which the hose is connected and the disks are mounted the front of the carriage. Considering the device, therefore, as a water motor, the motor may be considered to comprise the vaned disks and the train of gears connected with them and connecting them with the axle.

Considering the entire construction comprising both the hose reel and carriage, and the water-dispersing apparatus and carriage, it may be understood that the method of use will usually consist in locating the entire apparatus, comprising both the real carriage and the sprinkler carriage at one end of the area to be watered and withdrawing the sprinkler carriage,—unwinding the hose,— to the remote end of the area, or to the limit of the length of the hose. Then the water supply pipe being connected to the hollow shaft-in-common 22 of the hose reel and carrying wheels, and the sprinkler being withdrawn from the hose carriage to release the trip lever, $75^x$, and permit the three-way valve, 60, to be set at the position for admitting the water to the hose and if desired, also to the water motor, the water from the source of supply will pass through the hose to the sprinkler and be discharged to the disks, $A^{11}$; whereupon the entire sprinkling apparatus operating as a motor will limitedly and slowly operate the sprinkler carriage for propelling it back toward the hose carriage, while at the same time the water motor on the hose carriage is operating limitedly for winding up the hose, but not so powerfully as to drag the reel carriage any faster than it would be propelled by the water motor which it carries, consisting of the dispersing apparatus and gear train therefrom, the carrying wheels, $C^8$, $C^8$, being of the nature of traction wheels engaging the sod, so that the two motor devices one the water motor, (or if in service, instead, the spring motor) and the water motor comprising the dispersing apparatus on the sprinkler carriage, co-operating to cause the sprinkler carriage to approach the reel carriage without any substantial longitudinal stress upon the hose which is being wound up, or whose slack has been taken up by winding, on the reel. In this operation it may be considered either that the water motor or spring motor on the reel carriage pulls the sprinkler carriage as fast as the motor mechanism on the latter carriage permits by rotation of the carrying wheels, $C^8$, or, on the other hand, it may be considered that the water motor consisting of the dispersing apparatus and gear train on the sprinkler carriage propels that carriage back toward the wheeled carriage at a speed limited by the force at which the water is discharged in view of the speed-reducing train from the disks to the axle, while the water motor on the reel carriage merely takes up the slack of the hose due to the approach of the sprinkler carriage to the reel carriage, and, in fact, the two motor devices may be relatively constructed for rendering either one the propelling and the other the yielding or slack-taking means, and in either case both will contribute to the retraction of the sprinkler carriage to the reel carriage.

In consideration of the fact that the impingement of the jets of the nozzles, $a^{10}$, $a^{10}$, of the vanes, $a^{11}$, $a^{11}$, for dispersion and development of power for propelling the carriage, reduces the distance to which the water is thrust laterally with respect to the line of travel of the carriage, it is desirable to supplement these nozzles, $a^{10}$, $a^{10}$, by others whose jets shall avoid the dispersing and power-developing devices and consequently cover the maximum range laterally of the line of travel which is possible with a given water pressure. For this purpose the pipe branches, $A^{10}$, $A^{10}$, of the chamber, $A^1$, are each branched as seen at $A^{14}$, $A^{14}$, these branched pipes terminating in nozzles, $a^{14}$, $a^{14}$, positioned and directed for discharging their jets in vertical planes sufficiently oblique to the vertical planes of discharge of the nozzles, $a^{10}$, $a^{10}$, to avoid encounter or intersection of the jets from the nozzles, $A^{10}$, and $A^{14}$, respectively, and that such angle of elevation as to cause delivery of the water from the nozzles, $A^{14}$, as widely as possible with the available water pressure.

It will be obvious that if desired the retraction of the sprinkler carriage may be performed entirely by the means provided for winding up the hose on the reel, if the hose is strong enough to endure the strain of this mode of operation. For this purpose it is only necessary to disconnect the gear train of the sprinkler carriage as by withdrawing the key holding the gear $C^{16}$, fast to the shaft, $C^7$, or displacing the gear, $C^{16}$, on the shaft out of mesh with the worm, $C^{15}$. When this is done the dispersing disks, $A^{11}$, may be retained for their function of dispersing the water which is performed quite independently of their function of developing power for propelling the carriage.

I claim:—

1. In a construction for the purpose indicated, in combination with a reel carriage, a reel having a hollow shaft rotatably mounted on the carriage, a water supply pipe terminal positioned on the carriage axially with respect to the reel, a hose pipe wound on the reel having duct connections at the axis of the reel comprising said hollow shaft, said connection being made outside the reel at one end of the latter, and a swivel coupling to the water supply terminal at the opposite end of the hollow shaft and outside the opposite end of the reel.

2. In a construction for the purpose indicated in combination with a wheeled carriage, a reel rotatably mounted thereon; a water supply pipe terminal positioned on the support axially with respect to the reel; a hose pipe wound on the reel having duct connections at the axis of the reel, and a swivel coupling at said axis between the supply pipe terminal and the hose duct terminal; a shut-off valve controlling said supply pipe; a lever for opening said valve, a spring reacting for closing the valve; a trip latch on the carriage for engaging the lever to lock it in open position of the valve; motor means for rotating the drum to rewind the hose thereon; a water distributer to which the free end of the hose is attached; a carriage upon which said water distributer is mounted for travel over the area to be served; said distributer carriage having means for encountering and releasing the trip latch when said carriage is retracted to the reel carriage by the rewinding of the hose.

3. A construction for the purpose indicated comprising a supporting structure; a reel mounted thereon for winding a hose pipe having its shaft constituting a pipe for attaching one end of the hose, and a swivel pipe fitting adapted for connection to a source of water supply; a motor device mounted upon the support adapted to be energized by the rotation of the reel in unwinding the hose, and to react for rewinding the hose on the reel; a water distributer connected to the free end of the hose; a carriage upon which said distributer is mounted; carrying wheels for said carriage and a train by which they are actuated for movement of the carriage back toward the reel support, and means operated by the water discharged from the hose for governing the carrying-wheel-operating mechanism for limiting the rate at which the carriage is retracted by the winding up of the hose.

4. In combination with a hose reel, a supporting structure for the same; a member on the supporting structure coaxial with the reel, and having terminals for coupling respectively a water supply pipe and one end of a hose to be wound on the reel, one of said couplings being swiveled, the hose pipe having one end connected for winding the hose on the reel; a nozzle to which the other end is connected and a wheeled carriage on which the nozzle is mounted; motor means for rotating the reel to wind up the hose thereon, and water dispersing means on the carriage operated by the discharge from the nozzle; a driving connection between the water-dispersing means and the carrying wheels of the nozzle carriage for controlling the yielding of the carriage to the pull of the hose wound on the drum.

5. An apparatus for the purpose indicated comprising a hose reel and a support on which it is mounted; a water distributer and a carriage upon which it is mounted; a hose wound upon the reel; a water supply connection carried by the reel support and connected to the inner end of the hose mounted on the reel, the other end of the hose being connected to the water distributing device on the carriage; motor means for rotating the wheel to wind up the hose for retracting the carriage toward the reel, and means operated by the water passing through the hose for governing the rate at which the carriage is retracted by the winding of the hose on the reel.

6. An apparatus for the purpose indicated comprising a hose reel and a support on which it is mounted; a water distributer and a wheeled carriage on which it is mounted; a water supply connection at the reel thereof; a hose pipe wound upon the reel having its inner end communicating with said water supply connection and its outer end connected to the water distributer on the carriage; a gear train on the carriage actuated by the water delivered through the hose and connected with the carrying wheels for propelling the carriage toward the reel support; and means on the reel support for yieldingly rotating the reel to wind the hose thereon as the same is yielded by the retracting travel of the carriage.

7. An apparatus for the purpose indicated comprising a hose reel and a support on which it is mounted; a water distributer and a wheel carriage on which it is mounted; a water supply connection at the reel support; a hose pipe wound on the reel having its inner end communicating with the water supply connection, and its outer end connected to the water distributer on the carriage; a gear train on the carriage actuated by the water delivered through the hose and operatively connected with the carrying wheels for propelling the carriage toward the reel support, and means on the reel support for yieldingly rotating the reel to wind the hose thereon as the same is yielded by the retarding travel of the carriage; a shut-off valve for controlling the water supply to the hose; means for yieldingly holding said valve normally at closed position; mechanical connections for opening the valve; a latch engaging said mechanical connections for locking the valve at open position, and means on the carriage for releasing the latch to permit the valve to close when the carriage arrives at the reel support.

8. In a water-dispersing apparatus in combination with a connection for a water supply pipe, two discharge nozzles positioned for discharge in the directions oppositely divergent from an intermediate direction, and two water-dispersing devices each consisting of a rotatable disk having water-dispersing vanes positioned for encounter of said vanes by the jets from the two nozzles respectively.

9. In combination with the construction defined in claim 8, two auxiliary nozzles connected and mounted relatively to the two first mentioned nozzles for delivering their jets respectively in vertical planes sufficiently oblique to the vertical planes of the dispersing disks to avoid both impact with said disks and intersection with the spray dispersed by said disks.

10. In a construction for the purpose indicated, in combination with a support, a reel mounted for rotation therein; carrying wheels for the support; a shaft-in-common for the reel and the carrying wheels; a hose pipe wound on the reel; a water supply pipe and connections for conducting water to the hose, the shaft being hollow and its cavity constituting part of the connection between the water supply pipe and the hose, said water supply pipe having swivel connection with the shaft-in-common; and means for making the shaft-in-common rigid with the reel.

In testimony whereof, I have hereunto set my hand at Chicago, Illinois, this 31st day of March, 1927.

GEORGE BROWNING.